United States Patent Office 3,499,163
Patented Mar. 3, 1970

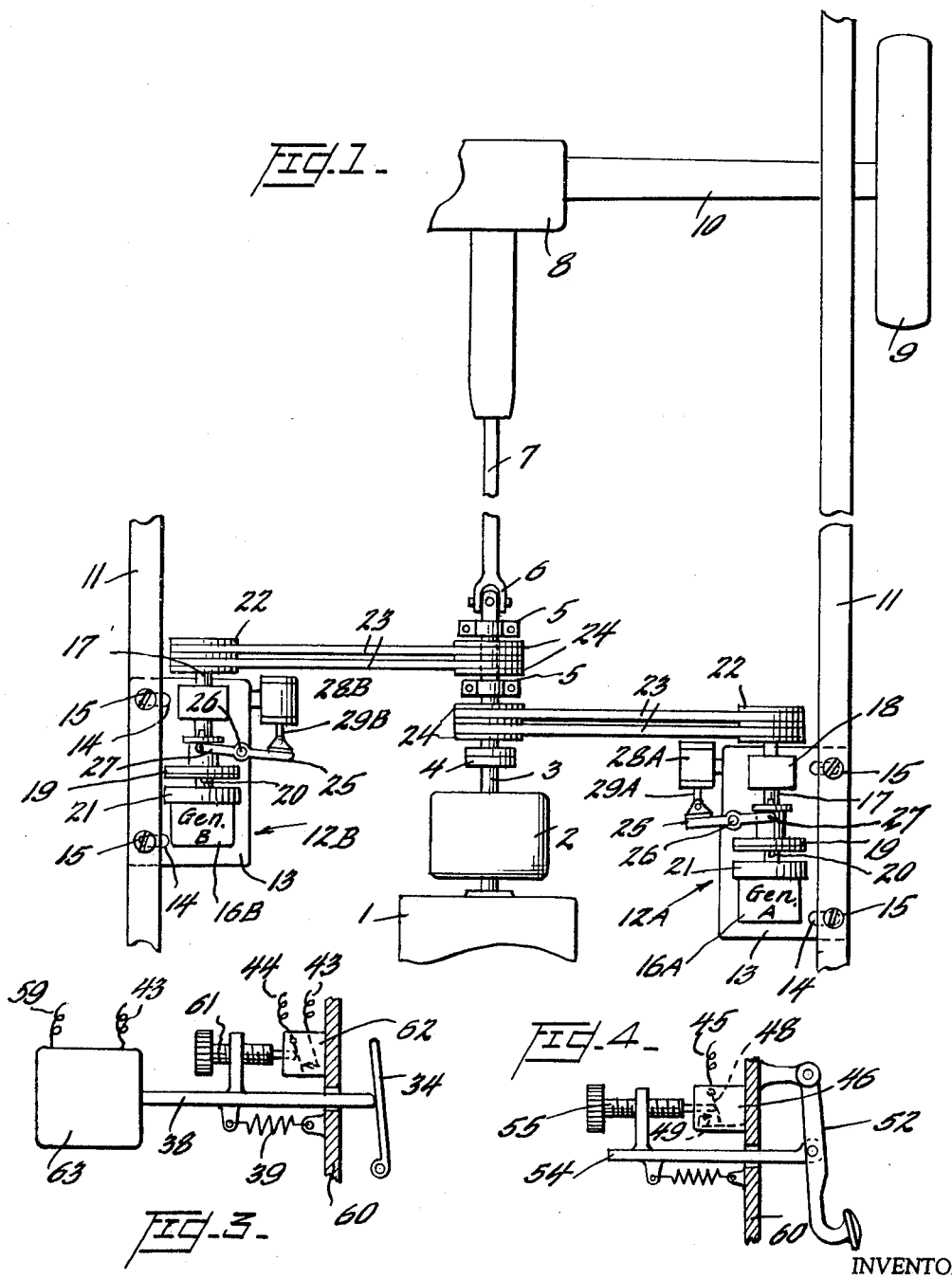

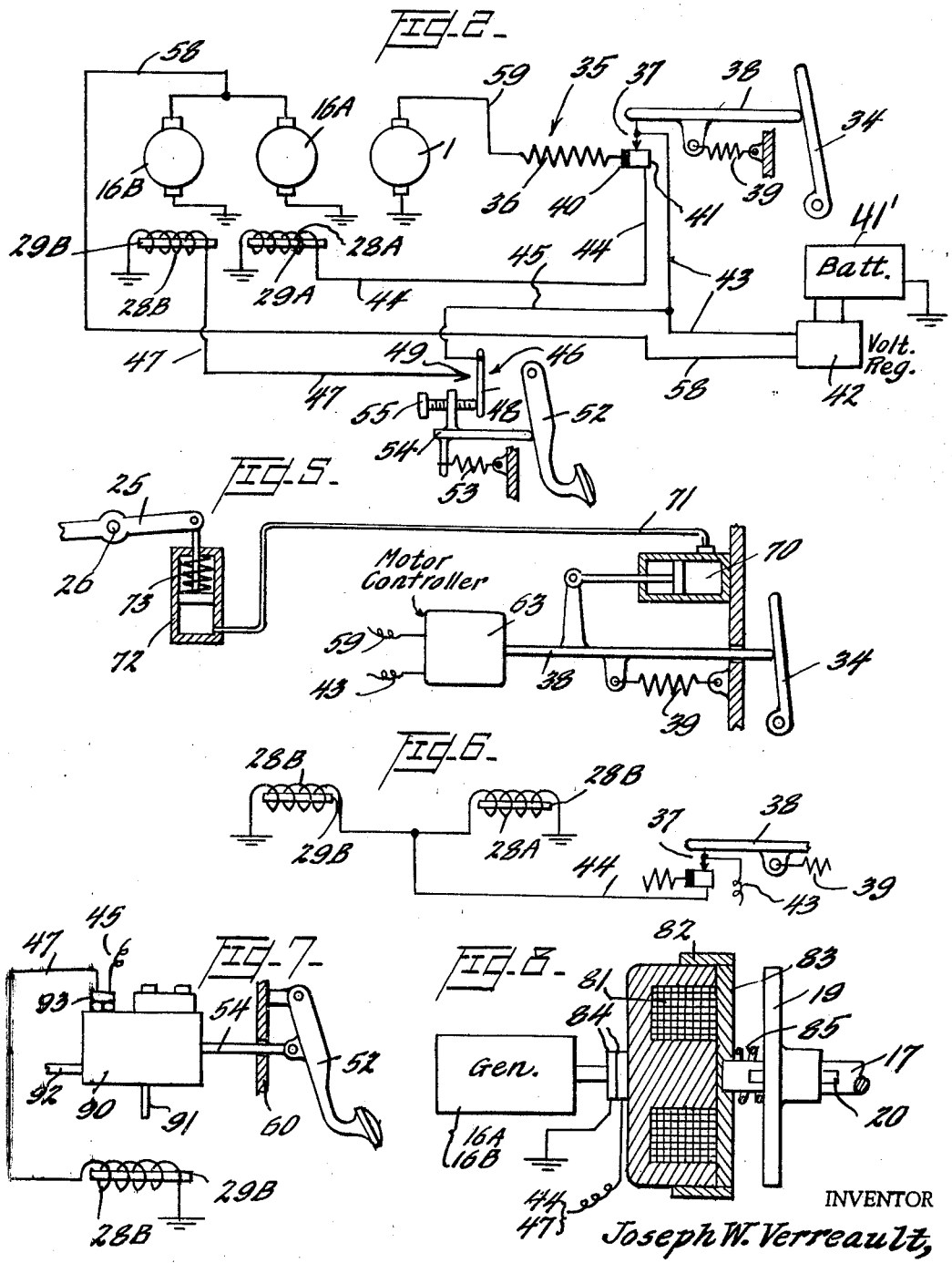

3,499,163
ACCELERATOR RELEASE CONTROL FOR
BATTERY CHARGING SYSTEMS
Joseph W. Verreault, 167 Morningside Drive, W.,
Bristol, Conn. 06011
Filed May 31, 1967, Ser. No. 642,411
Int. Cl. B60l 11/12
U.S. Cl. 290—16                                 10 Claims

ABSTRACT OF THE DISCLOSURE

A battery charging system for an electric motor driven vehicle, wherein a charging generator is connected to the power train between the motor and the vehicle driving means by a normally disengaged clutch. Upon the release of the accelerator, or the motor control means, to its release position, clutch actuating means is activated to clutch the charging generator to the power train to be driven thereby and thus the momentum of the vehicle under coasting conditions is used to drive the charging generator and recharge the battery.

---

This invention relates generally to an electric propulsion system for vehicles, and more particularly to a battery operated electric motor propulsion system for automobiles.

It is well known that an electric motor is a desirable prime mover for propelling vehicles from the standpoint of simplicity and air pollution. However, the main drawback in utilizing electric motors as prime movers for propelling automobiles is the lack of a proper power source for the electric motors. The present available practical power source is the conventional storage battery. A storage battery has a certain capacity, and after it has been exhausted, the battery must be recharged. The charging operation takes a relatively long time, and therefore, it is customary to replace discharged batteries with newly charged batteries, an operation which is also time consuming.

An object of this invention is to increase the time between battery changing and recharging operations by arranging the battery to drive the motor only when the automobile is accelerated or is driven under load. During no-load driving periods, the battery is charged by charging means driven by the movement of the vehicle due to its momentum or coasting motion.

To carry out the above object, a charging means is arranged to be clutched to a driving shaft driven by the vehicle's power train. The power train is the shafting and gearing which positively connects the transmission output shaft to the rear driving means. The clutch is normally disengaged but is moved to engaged position as soon as the operator releases the accelerator, or the means connected to the driving motor control means.

Another drawback in utilizing electric motors as prime movers is that an electric motor does not have the retarding or braking effect of an internal combustion engine. When the accelerator is released in a combustion engine driven vehicle, the idling engine acts as a compressor brake and absorbs the momentum force of the vehicle. The rotor of an electric motor acts as a flywheel, and does not absorb the momentum force. To remedy the above drawback, the charging operation during the period when the accelerator is in release position and absorbs the vehicle's momentum energy, exerts a braking or retarding force upon the free movement of the vehicle.

Another object is to use the charging means as an additional positive brake means. For such purpose, a second charging means is provided, similar to that described above, but activated as soon as the brake pedal is actuated.

Another object is to utilize electrically actuated clutch means to clutch the charging means to the power train, the actuating means to be controlled by the release of the accelerator, or by the initial application of the brake pedal.

Another object is to use hydraulic means to actuate the clutch means when the accelerator is released.

Another object is to utilize the present stop light switch to control the clutch means.

Other objects and features of the present invention will become apparent upon a careful consideration of the following detailed description when taken together with the accompanying drawings, wherein:

FIGURE 1 is a view of the arrangement of the several parts of the invention applied to a conventional automobile chassis;

FIGURE 2 is the circuit diagram employed in carrying out the invention;

FIGURE 3 shows in detail the accelerator in released position, wherein it maintains the clutch solenoid switch closed;

FIGURE 4 shows in detail the brake pedal in tis released position, wherein it maintains the clutch solenoid switch in open position;

FIGURE 5 shows an alternative means for actuating the clutch of the charging means comprising a hydraulic pulsator means in lieu of the electric means;

FIGURE 6 shows a wiring circuit wherein all the charging means are energized by a single control member, as the accelerator;

FIGURE 7 is similar to the arrangement of FIGURE 4 but employs the conventional master cylinder stop-light switch to activate the clutch solenoid; and FIGURE 8 discloses another form of an electrically controlled clutch means which may be utilized in the system.

Referring to FIGURE 1, electric motor 1 drives through a transmission 2, which may be either manually controlled or of an automatic type, shaft 3 which is connected to the transmisison's output shaft by coupling 4. Shaft 3 is supported in bearing means mounted in split pillow blocks 5, and is connected to drive-shaft 7 by universal joint 6. Shaft 7 drives differential gear means 8, and therethrough wheels 9 mounted on axles 10 in the well known manner. Means 3 and 6 to 10 form the power train from motor 1 to wheels 9.

The charging means 12A and 12B are shown mounted symmetrically to the vehicle's power train but may be mounted in any convenient arrangement suitable to the specific vehicle and its running gear. The charging units are duplicates, and the description of one will suffice for a clear disclosure. Unit 12A is controlled by accelerator action, and unit 12B is controlled by brake action.

Frame 11 carries plates 13, which may be adjustably secured thereto as by slot and bolt connections 14, 15. Plates 13 support charger units 16A and 16B. Each unit comprises a high current generator suitable to charge storage batteries. Shaft 17, supported in bearing 18 mounted on plate 13, carries a slidable clutch plate 19 keyed by key 20 to the shaft. Clutch plate 19 cooperates with plate 21 secured to the generator shaft.

Plate 21 is a relatively heavy disc which acts as a fly wheel to obtain a high inertia effect. Since it is desired to utilize the charging means also as braking means, disc 21, due to its weight, effectively absorbs the energy of the moving vehicle, since disc 21 is accelerated from rest to a high rotational speed when it is engaged by rotating clutch plate 19.

Shaft 17 is rotated by pulleys 22 driven through belts 23 from pulleys 24 secured to shaft 3.

Clutch plate 19 is slidably moved by means of lever 25 pivoted at 26 and having a forked end 27 which engages a grooved portion on plate 19 to shift it in the well known manner. Lever 25 is actuated by solenoid 28A (or 28B in the other charging unit) and armature 29A to which it is connected.

FIGURE 2 shows diagrammatically the circuit for controlling the solenoids by the accelerator and brake pedal, and the other electrical interconnections. Accelerator 34, which may take any form, such as a lever, pedal, wheel, etc., is connected to the motor control means 35 to vary the speed and operation of driving motor 1. In the embodiment shown in FIGURE 2, controller 35 may assume the form of a conventional variable potentiometer or rheostat means 36 having its adjustable contact means 37 connected for movement to rod 38 actuated by accelerator 34. Spring 39 biases means 34, 38, 37 to release position. In the release position, means 37 contacts block 41 separated from means 36 by insulating means 40.

Still referring to FIGURE 2, battery means 41' which may consist of numerous cells or battery units to supply the desired voltage and current requirements, is connected to voltage and current regulating means 42. A wire 43 connects the battery to contact 37. Wire 44 connects block 41 to solenoid 28A. Wire 45 connects wire 43 to a contact 48 of a switch 46 and a wire 47 connects solenoid 28B to the other contact 49 of switch 46. As shown schematically in FIGURE 2, brake pedal 52 is biased to release position by spring 53 connected to a fixed part and rod 54 which connects the brake pedal to the master cylinder (not shown). Rod 54 carries a threaded and headed member 55 (see FIGURE 4) which engages contact 48 to maintain switch 46 "open" when the brakes are released.

To complete the circuit, generators 16A and 16B are connected by wire 58 to the voltage regulator 42. Wire 59 connects motor 1 to its controller 35. The motor, generators, solenoids and battery are, of course, connected to a common ground shown diagrammatically.

The operation of the system may now be described. When driving power is no longer desired, the accelerator 34 is released. As shown in FIGURE 2, in the released position, contact 37 of controller 35 rests on block 41. Thus, a closed circuit is formed from the supply source 41'–42 by means 43, 37, 41, 44 to solenoid 28a. Armature 29A is moved up (FIGURE 1) to shift rotating clutch plate 19 to engage clutch disc 21 on charger or generator 16A, and thus the generator is rotated. The generated current flows through wire 58 to charge the battery. Thus, the generator is driven by the momentum of the car whenever the accelerator is released, and thereby, there is no lost momentum energy, for it is changed to electrical energy and stored in battery 41'. The action of charging also causes a braking or retarding effect on the vehicle, since its momentum energy is absorbed in charging. The weight of disc 21 may be chosen to obtain any desired braking effect upon accelerator release.

If further braking is desired, brake pedal 52 is actuated. Its initial movement moves member 55 to the left (FIGURE 2) and permits contacts 46 and 49 of switch 46 to close. Thus, a closed circuit is established to solenoid 28B via means 43, 45, 48, 49, 47, and armature 29B is actuated to engage the clutch means of charger unit 16B. Clutch disc 21 of unit 16B may be heavier than that of unit 16A, since a greater braking effort is desired. To resume speed, accelerator 34 is depressed moving contact 37 off block 41 to variably contact means 36 to energize motor 1. The connection between wires 43 and 44 is thus broken and solenoid 28A is deenergized. A spring (not shown) actuates armature 29A and lever 25 to disengage clutch means 19–21. Rotation of generator 16A continues until all of the momentum force of disc 21 is dissipated.

Specific details of the above described system and some modifications will now be described.

FIGURE 3 shows a modified form of the accelerator controlled means. Switch 62 is fixed to fire wall 60, or some other fixed portion of the vehicle, and its contacts are connected to wires 43 and 44. As shown in the figure, the contacts are closed by threaded adjustable member 61 carried on rod 38, and spring 39 biases means 38, 61 to close switch 62. 63 represents any conventional motor control means for motor 1 and is actuated by accelerator 34 through rod 38. Wires 43 and 59 are shown connected to controller 63.

FIGURE 4 is a detailed view of the relation of switch 46 to brake pedal 52. Switch 46 is mounted on the fire wall or similar fixed portion of the vehicle. Member 55 is carried by master cylinder rod 54 and may be adjusted thereto. In the released brake position, means 55 moves contact 48 away from contact 49 to "open" the switch.

Instead of electrical actuation of the charger clutch means, other means may be used. FIGURE 5 discloses a hydraulic pulsator system interposed between accelerator 34 and clutch shifting lever 25. Motor controller rod 38 is connected to the piston of the master cylinder unit 70. Unit 70 is connected by conduit means 71 to motor unit 72. The piston of motor unit 72 is connected to lever 25 and is biased by spring 73 to move lever 25 and the clutch plate attached to it to non-clutching position. FIGURE 5 illustrates the accelerator release position, wherein return spring 39 moved rod 38 to move the piston of unit 70 to the right and thereby created a pressure on the column of liquid filling units 70 and 72 and its pipe 71. The pressure liquid caused movement of the motor piston to shift the clutch to connect the charging unit to the power train. Spring 73 was compressed by the above operation. Upon movement of the accelerator in a driving direction, spring 73 causes the return of the motor piston and declutching of the charging unit.

Similarly, mechanical connections may be interposed between rod 38 and lever 25 to transmit clutching movement to lever 25. For example, a Bowden wire means may be utilized as the above described mechanical connection.

In some instances it is not desired to use the charging action as a significant braking means. FIGURE 6 shows the arrangement wherein both chargers may be controlled by the accelerator alone. FIGURE 6 shows accelerator 34 in the released position with contact 37 closing the circuit 43, 41, 44. Wire 44 is connected in parallel to both solenoids 28A and 28B, and thus, both charger units 16A and 16B are energized.

If no braking action is desired, generator circuit 16B and its control means may be eliminated and a single generating unit 16A of desired size would then supply the required charging rate.

To simplify the switching arrangement for the brake pedal, the present stop light switch found in all master cylinders may be used, and FIGURE 7 shows an arrangement for carrying out the above operation. Master cylinder 90 is provided with the usual outlet pipes 91 and 92, connected to the front and rear brakes, and the conventional pressure operated stop light switch 93. Switch 93 is connected to wires 45 and 47. As soon as pedal 52 is moved, pressure builds up and switch 93 connects wires 45 and 47 to energize solenoid 28B to actuate the charging means clutch.

FIGURE 8 discloses a magnetic clutch which may replace the solenoid and clutch means 28A, 29A, 25, 21, etc., of FIGURE 1. A cup shaped housing provided with coil 81 is carried by the generator shaft. To complete the magnetic flux circuit when coil 81 is energized, an annular member 82 is provided which cooperates with face plate 83. Coil 81 is electrically connected to wires 44 or 47 and to the ground by conventional insulated slip ring 84.

In operation, when wire 44 or 47 is energized, coil 81 is also energized to magnetically pull plate 19 to face plate 83, in the well known manner. Thus, plates 19 and 83 form a clutch couple and rotation of shaft 17 is transmitted to the shaft of generator 16A or 16B. Spring 85 biases plate 19 away from plate 83.

While a particular embodiment of the invention and certain modifications in the details have been shown and described, it is apparent that other modifications and alterations may be made, and it is intended in the appended claims to cover all such modifications and alterations as may fall within the true spirit and scope of the invention.

I claim:

1. An electric propulsion system for vehicles comprising a battery, a motor, a circuit interconnecting the motor and battery, motor control means interposed in said circuit, accelerator means for actuating said motor control means, means biasing said accelerator means to release position wherein said motor control means disconnects the motor from the battery, a power train connecting the motor and the vehicle drive means, a charging unit connected to the battery; motion transmitting means connecting the charging unit to the power train and including a normally-disengaged clutch means, a clutch actuating means to move the clutch means to the engaged position wherein the charging unit is connected to and driven by the power train, control means for said clutch actuating means, said control means being positioned to be operated by said accelerator means, when the accelerator means is moved to the released position by said biasing means, thereby causing operation of said clutch actuating means to move said clutch means to its engaged position to drivingly connect the charger unit to the power train.

2. The system set forth in claim 1 wherein the clutch means, its actuating means and the control means comprise a shiftable member to engage the charging unit, a solenoid means to shift said member, a circuit connecting the solenoid and battery, an open switch in the circuit, and means for closing said switch connected to the accelerator means and operative when the accelerator means reaches the release position.

3. The system set forth in claim 2 wherein the means to close said switch comprises a member adjustably secured to the accelterator means for varying the closure of the switch relative to the release position.

4. The system set forth in claim 2 wherein the clutch means is of the magnetic type with the coil housed in the clutch part connected to the charging unit.

5. The system set forth in claim 2, a second charging unit, a second means including a normally disengaged clutch means connecting the second charging unit to the power train, a second solenoid for actuating said second clutch means, and means connecting said second solenoid to the circuit in parallel with the solenoid means set forth in claim 2 so that closure of the switch actuates both solenoids to clutch both generating units to the power train.

6. The system set forth in claim 1 wherein the means connecting the charging unit to the power train comprises a mounting plate adjustably secured to a fixed part of the vehicle, said plate supporting the charging unit and a stub shaft aligned therewith, a shiftable clutch plate keyed to the stub shaft for engaging and disengaging a cooperating plate on the charging unit, and means connecting said stub shaft to the power train to be rotated thereby.

7. The sysem set forth in claim 1, a second charging unit, a second means including a normally disengaged clutch mean connecting the charging unit to the power train, actuating means for said second clutch means, a brake applying means for the vehicle including a brake pedal, and control means to activate said second clutch actuating means responsive to the initial movement of the brake pedal in brake applying direction.

8. The system set forth in claim 7 wherein the second clutch actuating means comprises a solenoid, a circuit connecting said solenoid to the battery, said circuit incorporating a normally open, pressure responsive switch connected to the brake master cylinder, said switch responsive to the initial pressure rise to close, thereby completing the circuit to energize said second solenoid for actuating the clutch means.

9. The system set forth in claim 8 wherein the pressure responsive switch is the regular stop-light switch of the braking system.

10. The system set forth in claim 1 wherein the clutch actuating means comprises a pulsator system constituted by a fluid motor unit connected to the clutch means, a master cylinder and piston unit, means interconnecting the master piston and the motor control means for actuating said piston when the motor control means reaches release position, a conduit connecting said motor unit and master cylinder, and liquid filling said fluid motor unit, conduit and master cylinder to transmit movement of the motor control means to the fluid motor unit to thereby actuate the clutch means.

References Cited

UNITED STATES PATENTS

| 723,727 | 3/1903 | Pfeil | 318—139 |
| 1,562,903 | 11/1925 | Miller | 318—139 X |
| 1,766,163 | 6/1930 | Vukosav | 322—12 X |
| 3,044,350 | 7/1962 | Hartnett | 310—103 X |

ORIS L. RADER, Primary Examiner

W. E. DUNCANSON, Jr., Assistant Examiner